Sept. 13, 1932.  J. W. MARTIN, JR  1,877,187
REFRIGERATING APPARATUS AND METHOD
Original Filed Dec. 8, 1928
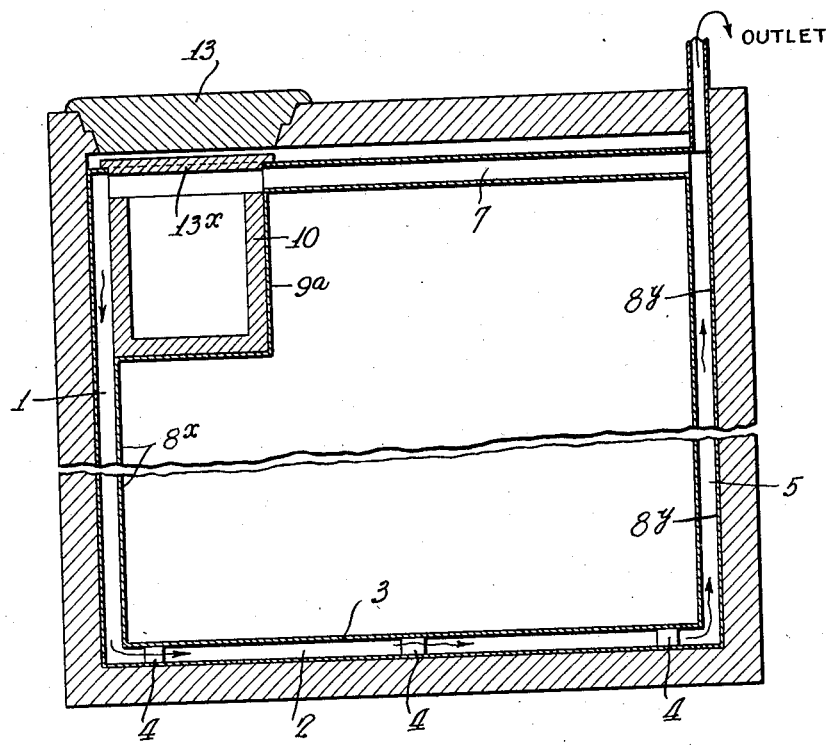
INVENTOR
James W. Martin Jr.
BY
George C. Aleau
ATTORNEY Patented Sept. 13, 1932

1,877,187

UNITED STATES PATENT OFFICE

JAMES W. MARTIN, JR., OF YONKERS, NEW YORK, ASSIGNOR TO DRYICE EQUIPMENT CORPORATION, OF NEW YORK, N. Y., A CORPORATION OF DELAWARE

REFRIGERATING APPARATUS AND METHOD

Original application filed December 8, 1928, Serial No. 324,639. Divided and this application filed March 21, 1930. Serial No. 437,651.

My present invention relates to apparatus and methods set forth in my application Ser. No. 116,103, now Patent No. 1,752,015 and in Ser. No. 324,639, now Patent 1,752,276 which is a continuation in part of the former application and of which this application is a division.

Both of the above cases, as well as this case, relate to refrigerators of the type adapted to employ very intense refrigerants, particularly solid carbon dioxide.

This invention is particularly useful in connection with refrigerators having side doors, such as the ordinary household refrigerator, but the principles involved, as also many of the specific details, will be found useful in various embodiments, as for instance, in cold storage houses, refrigerating cars, trucks or the like.

As in the cases above mentioned, the object here is to utilize certain unique qualities peculiar to solid carbon dioxide, as for instance, solid carbon dioxide sublimes directly to gas, there being no intermediate liquid state, and at a temperature of approximately 110° F. below zero, although different conditions may cause it to vary within wide limits above and below this temperature. The resulting carbon dioxide gas is very heavy because of its low temperature and also because of its great molecular weight as compared with air. Even at the same normal temperature, carbon dioxide gas is much heavier than air and it is a much better heat insulator. Because of the greater weight of the gas, it results that when the sublimation of the solid takes place at atmospheric pressure, in a container arranged to permit escape of gas only by high level overflow, the heavy gas will settle in the bottom of the container slowly, filling the same much as if it were water being poured in, and when the container becomes filled, the gas will then overflow and tend to flow downward by gravity.

One of the important factors in relation to solid carbon dioxide is that when the gas sublimated therefrom is discharged through passages or ducts in protective or heat absorbing relation to a refrigerated space, the gas will tend to carry along with it the heat that penetrates through the walls of the passages. Thus, a substantial amount of this heat will be carried away and discharged outside the refrigerator, either by leaking out through the refrigerated space or preferably by direct outside outlet from the passages.

Under some conditions, it is undesirable to have the interior of the refrigerated space filled with the sublimed carbon dioxide gas or in some cases even to have a small percentage of carbon dioxide gas in the atmosphere within the refrigerated space, for example, in those instances where men must enter or work in the refrigerated space.

In this application, the purposes in view include efficient utilization of the heat absorbing value of the solid carbon dioxide; the high heat insulating value of the gas sublimed therefrom; the heat purging value of the carbon dioxide gas; while still keeping the gas out of the atmosphere of the refrigerated space, in addition to supplying a refrigerator of the so-called duct type in which the refrigerated chamber is practically totally surrounded by ducts carrying the cold insulating carbon dioxide gas and the part not so surrounded is in comparatively high heat exchange relation with the container for the solidified carbon dioxide.

Another purpose is to provide for continuous circulation of carbon dioxide gas from the source into and through the ducts surrounding the refrigerated chamber or the interspace formed by the inner and outer containers, returning the coldest part of the gas to the refrigerant container while the warmest part is removed at some point in the circulation before the return to the source, and exhausted outside the apparatus. This arrangement combines in one apparatus the principal features of my two co-pending applications above referred to, that is a continuously flowing blanket of cold carbon dioxide gas acting in the capacity of both a refrigerant and insulator, part of the gas circulating in a substantially complete surround of the refrigerated chamber as in Patent No. 1,752,015 and part being exhausted outside of the apparatus, after having circulated around a substantial part of the refrigerated chamber, as in Patent No. 1,752,276.

The arrangement shown in the drawing is very efficient and unique; it permits of gas circulation ducts on all sides and top and bottom of the refrigerated chamber and withdrawal of the warmest part of the gas from the circulation, while the coldest part although warmer than newly sublimed gas due to its absorbing heat during its circulation, is returned to the refrigerant container where it mingles with the colder newly sublimed gas that comes from the solid carbon dioxide, thus having its temperature lowered before it again passes into the circulation. The refrigerant container is maintained closed against free entry of air but as pointed out above, it is in free and direct communication with the gas circulation, in fact, it acts as the source of that circulation and also as a recooler of the same.

Gas sublimated from the refrigerant will cause a constant outleak through the outlet, preferably located at the highest point in the circulation, but if from any cause there should be insufficient gas to force outleak thereby permitting inleak of warm outside atmosphere, then this warm atmosphere coming in contact with the solid carbon dioxide would immediately increase the rate of gas sublimation therefrom, the cold gas driving out the warm atmosphere, thus preventing further inleak of warm outside atmosphere.

Preferably, the carbon dioxide refrigerant is in a compartment which is open at its top only and which is located in the top of the refrigerator, the arrangement being such that the heavy gas flows downward in an interspace between the double walls, or through a suitable conduit, to a bottom space through which the gas flows laterally to and then up through passages which may be the interspaces between the outer refrigerator shell and the inner shell which encloses the refrigerated space. At a high level part of the interspace or similar conduit means, is preferably located a vent through which the warmer portions of the upflow gas is exhausted outside the refrigerator, the cooler portions of the gas flowing through a return conduit or interspace for recirculation with the fresh gas from the solid carbon dioxide container.

In the type of refrigerator here shown, the refrigerant container is preferably located near the top and adjacent one side of the refrigerator, the gas overflows the side of the container next to the wall of the refrigerator for thermo-circulation through ducts that surround but are entirely outside of the refrigerated space.

In the present case, the return conduit delivers the returning gas at a higher level than the side from which the fresh gas overflows, thus insuring circulation in the desired direction. This may be accomplished by arranging the point of return of the gas slightly higher than the point from which the flow into the ducts starts, this difference in level being shown in the drawing as the thickness of the lower wall of the duct 7 or, if the side wall of the refrigerant container, over which the overflow is desired, were slightly cut away on top it would have the same effect. The heavy cold gas naturally having a tendency to fall or spill from the lowest point and being colder and heavier than the gas that has already traversed part of the circulation, will cause an unbalanced condition between the downflow and upflow leg of the circuit, thereby forcing the warmer portions of the gas upwardly.

The outlet for the upflow column is preferably higher, but may be lower, than the inlet of the downflow column, and I may employ valves in either of these columns or in either of the lateral passages, controlled manually or by well known thermostatic elements. The natural self-regulating quality of the counterbalance may thus be subject to arbitrary control.

A valve may be arranged to control flow from the refrigerant container in the down column either by cutting it off entirely or limiting it to a small predetermined minimum. Whenever this valve is open, the extremely heavy gas will fall rapidly in the down column, creating a suction and tending to draw the warmer gas from the return duct or perhaps even drawing warm atmosphere through the outlet from the outside. When the warmer gas from the return duct, and atmosphere from the exterior, is drawn into the refrigerant container, it has the remarkable effect of lowering the sublimating point of the solid and causes a substantial increase in the sublimation rate.

The above and other features of my invention will be more evident from the following description taken in connection with the accompanying drawing, in which is shown a vertical section of a refrigerator embodying the principles of my invention.

In this drawing, a conventional type of refrigerator is indicated as comprising an outer refrigerator structure or casing which may be of any suitable heat insulating construction, enclosing suitable means for storing the solid carbon dioxide and for guiding and confining the gas therefrom. As shown, this consists of a double-wall inner structure comprised of an outer gas-tight wall or lining $8y$ and inner gas-tight walls $8x$ of smaller dimensions, arranged to afford interspaces 1, 2, 5, for circulation of the gas. The inner lining may rest on suitable supporting blocks 4, preferably parallel with the floor of the outer structure, but if desired, it may be positioned at a slight angle in order to facilitate draining of the interior if the same is desirable, as when it is cleaned. Preferably, located in the top and to one side, provision is made for the refrigerant container 10. This container may be located in a recess 9a formed in the inner lining. This construction provides a downflow passage 1, into which gas overflows from the solid carbon dioxide container 10. In passage 1, the gas flows downward to a lateral passage 2, which will ordinarily underlie substantially the entire floor area; and from this the gas flows upward in interspaces 5, preferably at the side and the back and front of the refrigerator. Extending over the top is a conduit or interspace 7, through which the gas from the upward passage 5 returns to the refrigerant container 10. This part of the flow circuit has an opening through which refrigerant may be supplied but normally the opening is closed by a removable cover 13x. As is evident from the drawing, this construction provides a solid carbon dioxide container, maintained closed against free entrance of outside atmosphere, but in communication with an interspace which surrounds practically the entire refrigerator chamber.

Above the refrigerant container and top 13x is an opening through the outer structure, closed by the cover 13, to permit access to the refrigerant container so that the same may be charged with the refrigerant. From some point, preferably the highest point in the gas circulation space and fairly remote from the refrigerant container is provided a vent or outlet as shown in the drawing.

Articles or material to be refrigerated will be within the inner lining as defined by the bottom 3, walls 8x and 8y and the front top and bottom thereof and the gas will be excluded therefrom as is evident from the above description. The solid carbon dioxide having an extremely low sublimating point, approximity $-110°$ F. will absorb heat from within the refrigerator and also from the warm gas that is returned to it, thereby sublimating a corresponding amount of solid to gas. The gas will circulate in the paths shown by the arrows, overflowing the side of the container 10, gravitating downward in interspace or conduit 1 and laterally across the floor through 2, upwardly through 5. As the gas thus circulates, it progressively becomes warmer, consequently lighter, the lighter portions seeking the highest point will be vented outside the refrigerator through the outlet which is preferably placed at the highest point in the circulation. The balance of the gas, which in this case would be the coolest portion, returns through the interspace 7 and flows across the top of refrigerant container 10, for diffusion, cooling and eventual recirculation along with fresh cold gas that normally lies below it.

If any of the doors (not shown) in the refrigerator are opened, there is no possibility of escape of the cold gas as the same is confined within closed duct spaces and even if the temperature of the entire refrigerating space is raised by holding open a door or doors for too long a period, it is still impossible to unduly warm up the walls and top and bottom, as there will be at all times a substantial volume of the cold gas within these walls, operating to quickly restore the standard low temperature the instant the doors are closed.

The outlet may be controlled or adjusted by a valve of any desired type, hand or pressure operated or thermostatic, or otherwise.

From the above, it will be evident that in the preferred form of my apparatus the flow circuit for the gas includes conduits in U-relation, affording potentially counterbalanced columns of the carbon dioxide gas with a circulation that is normally forced by the difference in weight of the cold gas in one leg of the U over and above the weight of the warmer gas in the other leg of the U so that there is a perpetual tendency of the column in the first mentioned or what might be called a generator leg to overbalance the other column and cause an outflow at the upper end thereof. Thus the rate of gas flow is governed primarily by the rate at which heat is conducted into the refrigerant container and, other things being equal, this depends on how warm the air is within the refrigerated space. The return circulation of the gas being across the top of the refrigerant container, or, so to speak, in shunt instead of series relation thereto, the gas evolution will be correspondingly more responsive to the temperature in the refrigerated space, and less responsive to the speed and temperature of the circulation, than it is where the circulating gas flows serially through the refrigerant container. This is of advantage because it permits the gas to flow around the circuit without becoming any colder than is necessary to enable it to traverse the downleg portion. Thus, the warm gas and air content, which would accelerate gas evolution, can reach the solid only by downward diffusion. As a result, the solid carbon dioxide is substantially submerged in and insulated by the fresh, cold, dry gas.

When from any cause, the atmosphere within the refrigerated space becomes abnormally warm, the rate of direct heat transfer to the refrigerant is increased and the temperature of the upflowing gas within the interspace 5, is raised, thereby increasing the rate of gas evolution and the speed of thermo-circulation of gas back to the refrigerant. The returning gas being relatively warm, will also tend to increase gas evolution until the abnormally high temperature has been corrected.

The bottom of the U-bend is like a water sealed plumber's trap, in that the heavy gas settling thereto by gravity from the generator leg, operates as a heavier fluid seal to prevent reverse flow or bubbling back of warm gas or air from the other leg. Hence, the generator leg is characteristically a downflow leg discharging through the other leg which is therefore characteristically an upflow leg.

From the above explanation of the broad principles of my methods, it will be evident that they may be utilized in various specific forms of apparatus disclosing a number of specific variations as to horizontal sectional areas of the columns; conductivities and radiating rates of the upflow column, as determined by the materials of the walls thereof or the degree of insulation of said materials; and as to location of relative arrangement of the refrigerant container box, the down column and the up column, each with reference to the other. In general, decrease of heat absorbing capacity of the down column in any of the known ways, as by small cross section or cylindrical cross section or insulation, will tend to great weight and low specific gravity of the down column, and consequently to a lower temperature of the up column, while great heat absorbing capacity for the up column, as by highly conducting walls of great area as compared with the other section, will tend to a suction effect in the refrigerant box with a consequent acceleration of gas evolution.

As explained in my prior applications, the inner walls of the double wall construction which confine the gas from flow into the refrigerated space are preferably of sheet metal, and in the present case, as in Fig. 3 of Patent No. 1,752,015, the entire double wall unit is preferably of the same material. The exterior casing in which these may be enclosed, may be of any desired heat-insulating structure or material.

As also explained in said Patent No. 1,752,015, the automatic circulation control of temperature may be modified and predetermined to any desired extent by enclosing the solid carbon dioxide in paper, pasteboard or other insulating coverings of predetermined amount and gas-tightness.

I claim:

1. A refrigerating apparatus including an outer receptacle, a container for solid carbon dioxide which permits escape of gas only by overflow into a circuit for flow of said gas from the container, including a downflow conduit therefrom and an upflow conduit in communication with said downflow conduit and a return conduit to the solid carbon dioxide container, said circuit having an outlet for excess gas to the outside of said apparatus.

2. A refrigerating apparatus including an outer receptacle, a container for solid carbon dioxide within the outer receptacle, and a closed circuit for gas from the latter, including a downflow conduit into which the gas overflows from an upper portion of said solid carbon dioxide container, an upflow conduit from the latter terminating in an outlet and a conduit returning to said solid carbon dioxide container at or above the overflow level of the latter, and an outlet discharging excess gas outside said apparatus from the high-level, warm portion of said circuit.

3. A refrigerating apparatus including an outer receptacle, a container for solid carbon dioxide therein, arranged for escape of gas therefrom by high level overflow and a circuit for flow of gas from the latter, including a downflow conduit receiving the overflow from said solid carbon dioxide container and an upflow conduit from the latter and a conduit returning gas from the upflow conduit for recirculation with the fresh gas overflowing from said solid carbon dioxide container, but without flowing through said container.

4. A refrigerating apparatus including an outer receptacle, an inner liner within the outer receptacle and spaced therefrom, a container for solid carbon dioxide secured to the inner liner, the parts being so arranged that the gas sublimated from the solid carbon dioxide flows from the container into and through the interspace formed by the inner liner and outer receptacle, the warmest portion of said gas being exhausted outside said apparatus and the remainder being returned to the solid carbon dioxide container.

5. A refrigerating apparatus including an outer receptacle, an inner container of smaller dimensions than said outer receptacle, thus affording a gas circulation interspace, a solid carbon dioxide container, the parts being so arranged that the gas sublimated from the solid carbon dioxide overflows from an upper portion of its container and then downward and through said interspace, part of the gas returning to the solid carbon dioxide container at or above the overflow level of the latter and part being exhausted outside said apparatus.

6. A refrigerating apparatus including an outer receptacle, an inner container of smaller dimensions than the outer receptacle and spaced therefrom, thereby forming a gas circulation interspace on the sides and top and bottom of the inner container, a solid carbon dioxide container in said inner container and arranged so that the gas sublimated from the solid carbon dioxide within its container overflows therefrom into the interspace and flows through the interspace on all sides of the inner container, part of said gas returning to the carbon dioxide container through the interspace on the top and part being exhausted outside the apparatus.

7. A refrigerating apparatus including an outer receptacle, an inner receptacle having a solid carbon dioxide compartment, ducts between the inner and outer receptacle and surrounding substantially the entire inner receptacle, the parts being arranged so that gas sublimated from the solid carbon dioxide enters the ducts, part of said gas circulating through the ducts and returning to the source and part being exhausted outside the apparatus before it has circulated through all of the duct space.

8. A refrigerating apparatus including an outer receptacle, an inner receptacle having a carbon dioxide container, ducts substantially surrounding the inner receptacle, the parts being arranged so that gas sublimated from the carbon dioxide will flow down the side or sides, across the bottom, up the side or sides and back across the top to the carbon dioxide container, at a higher level than that at which it left it, for recirculation with fresh gas overflowing therefrom, and part of said gas being exhausted outside said appartus.

9. A refrigerating apparatus including an outer receptacle, an inner receptacle of smaller dimensions having a carbon dioxide container, a substantially air-tight interspace substantially surrounding the inner receptacle affording a closed circuit for thermo-circulation of gas from and to said carbon dioxide container, an outlet leading outside the apparatus from the interspace, the parts being arranged so that a portion of the gas sublimated from the solid carbon dioxide flows into and through the interspace and back to the solid carbon dioxide container, while another portion is exhausted outside the apparatus; free access of air to the solid carbon dioxide container and the interspace being had only through said outlet.

10. A refrigerating apparatus including a chamber for products to be refrigerated, a container enclosing solidified carbon dioxide separated from but in heat exchange relation with the refrigerated chamber and means for insulating as well as cooling said chamber, including thin, flat conduit means arranged as an insulating and cooling wall or walls for the refrigerated space and connected for continuous inflow and throughflow of gas overflowing from said container, back to the overflow level of said container for recirculation with fresh gas therefrom; and for discharge of part of said gas outside said apparatus after it has traversed at least a substantial portion of said conduits.

11. A refrigerating apparatus including a chamber for products to be refrigerated, a container enclosing solidified carbon dioxide separated from but in heat exchange relation with the refrigerated chamber and means for insulating as well as cooling said chamber, including thin, flat conduits arranged as an insulating and cooling wall or walls for the refrigerated space and connected for continuous inflow and throughflow of gas from said container, and for discharge of part of said gas outside said apparatus after it has traversed at least a substantial portion of said conduits and for returning the rest of said gas to its source.

12. A chamber for products to be refrigerated having most of its exterior walls and top and bottom of insulating double wall construction in combination with a container enclosing solidified carbon dioxide in heat exchange relation with said chamber and connected to discharge the gas sublimating from said solid into and through the interior of said double wall portions of said chamber, and thence a part of it outside said apparatus, and returning another part to its source.

13. A refrigerating apparatus including outer and inner containers formed and arranged to confine and permit circulation of gas between said containers in combination with a container enclosing solid carbon dioxide arranged so that said solid may absorb heat derived from the inner container and arranged for flow of the resulting dry cold gas between the containers, thereby forming a continuously renewed insulation of dry gas interposed between and absorbing heat from said inner and outer containers; and a high level exhaust duct to which said gas rises as it warms, and through which part of the excess gas is discharged outside said apparatus, while another part continues to circulate in said interspace.

14. A refrigerating apparatus including a container enclosing a space for products to be refrigerated and having walls arranged to afford insulating paths for circulation of insulating and cooling gas between the inner and outer surfaces of said walls, in combination with a container enclosing solid carbon dioxide arranged so that said solid may absorb heat derived from within the refrigerated space and arranged so that the resulting cold dry gas flows into said circulation paths, thereby maintaining a continuously renewed insulation of dry cold gas interposed between and absorbing heat from the refrigerated space and the exterior; and a high level outlet to which said gas rises as it warms, and through which the warmest part of the gas discharges outside said apparatus, the balance of said gas continuing in circulation.

15. The method of refrigerating products by evaporation of solid carbon dioxide which includes causing it to evaporate in a closed container, confining the resultant gas to form a downflow column and to form an upflow counterbalancing column, part of the gas from the upflow column being discharged outside the refrigerated space and part returning to the closed container.

16. The method of refrigerating products by evaporation of solidified carbon dioxide which includes causing it to evaporate in a container to which direct access of atmosphere is prevented, confining and guiding the resultant gas through an air tight conduit to form a downflow column and to form an upflow counterbalancing column and discharging part of the gas from the top of the upflow column outside the refrigerated space and returning the other part to said container.

17. The method of refrigerating by sublimation of solid carbon dioxide which includes enclosing it in a container, discharging the gas therefrom by overflow from a high level thereof, thereby maintaining the solid carbon dioxide in an atmosphere of freshly sublimated carbon dioxide gas, guiding and confining the overflowing gas through a closed circuit; discharging outside the apparatus, the excess gas from the warmer parts of the circuit; and returning the cooler parts for recirculation with fresh gas overflowing from the source.

18. The method of refrigerating by sublimation of solid carbon dioxide, which includes enclosing it in a container and discharging the gas therefrom by permitting it to overflow a side thereof, guiding and confining the gas through a downflow and upflow conduit adjacent the refrigerator chamber, returning part of the gas to said container and venting part thereof outside the refrigerator.

19. The method of refrigerating by sublimation of solid carbon dioxide which includes enclosing it in a container and discharging the gas therefrom by permitting it to overflow a side thereof, guiding and confining the gas in a closed circuit through a downflow and upflow conduit adjacent the refrigerator chamber, returning a portion of the gas to said container by a conduit delivering the gas to said container at a point higher than that at which the gas discharges from said container and permitting another portion to escape from said circuit.

20. A refrigerating apparatus including an outer receptacle, a container for solid carbon dioxide which permits escape of gas only by overflow into a circuit for flow of said gas from the container, including a downflow conduit therefrom and an upflow conduit to the solid carbon dioxide container, both the inner and outer walls of said conduit being of gas-tight sheet metal construction.

Signed, at New York, in the county of New York, and State of New York, this 20th day of March, A. D., 1930.

JAMES W. MARTIN, Jr.